US 6,735,030 B2

(12) United States Patent
Ngo et al.

(10) Patent No.: US 6,735,030 B2
(45) Date of Patent: May 11, 2004

(54) METHOD TO WRITE SERVO ON MULTI-CHANNELS WITH VOLTAGE MODE DATA AND SINGLE CHANNEL WITH CURRENT MODE DATA

(75) Inventors: Tuan Van Ngo, Eden Prairie, MN (US); Raymond Elijah Barnett, Apply Valley, MN (US); Scott Gary Sorenson, Lakeville, MN (US)

(73) Assignee: Texas Instruments Incorporated, Dallas, TX (US)

( * ) Notice: Subject to any disclaimer, the term of this patent is extended or adjusted under 35 U.S.C. 154(b) by 221 days.

(21) Appl. No.: 10/071,285

(22) Filed: Oct. 29, 2001

(65) Prior Publication Data

US 2003/0081340 A1 May 1, 2003

(51) Int. Cl.[7] .................................................. G11B 5/09
(52) U.S. Cl. .............................. 360/46; 360/68; 360/63
(58) Field of Search .............................. 360/46, 67, 68, 360/75, 61, 63, 47, 69; 327/108, 110

(56) References Cited

U.S. PATENT DOCUMENTS 6,271,977 B1 * 8/2001 Chung .......................... 360/46
6,324,028 B1 * 11/2001 Ramalho ....................... 360/68

* cited by examiner

Primary Examiner—Alan T Faber
(74) Attorney, Agent, or Firm—W. Daniel Swayze, Jr.; W. James Brady; Frederick J. Telecky, Jr.

(57) ABSTRACT

A write drive circuit (40) for a hard disk drive selectively providing a current mode operation for high speed data write of a single channel, and selectively providing a voltage mode operation during a servo write operation. A central buffer has a first circuit (50) providing a current mode drive signal to a head during a single channel write operation, and a second circuit (52) providing a voltage mode drive signal for multi-channel servo write operation. The outputs of both circuits (50, 52) is provided over a common differential connection (T1) feeding a pre-driver circuit (70) adapted to drive one or many heads, as determined by head select control lines (72). The circuit provides >1.6 Gb/s data write speed in single channel write operation, and has an architecture utilizing only two signal lines for four channels.

20 Claims, 4 Drawing Sheets

METHOD TO WRITE SERVO ON MULTI-CHANNELS WITH VOLTAGE MODE DATA AND SINGLE CHANNEL WITH CURRENT MODE DATA

FIELD OF THE INVENTION

The present invention is generally related to the field of mass media information storage devices, and more particularly to circuits for controlling the write current used to drive a thin film write head.

BACKGROUND OF THE INVENTION

Hard disk drives are mass storage devices that include a magnetic storage media, e.g. rotating disks or platters, a spindle motor, read/write heads, an actuator, a pre-amplifier, a read channel, a write channel, a servo circuit, and control circuitry to control the operation of hard disk drive and to properly interface the hard disk drive to a host system or bus. FIG. 1 shows an example of a prior art disk drive mass storage system 10. Disk drive system 10 interfaces with and exchanges data with a host 32 during read and write operations. Disk drive system 10 includes a number of rotating platters 12 mounted on a base 14. The platters 12 are used to store data that is represented as magnetic transitions on the magnetic platters, with each platter 12 coupleable to a head 16 which transfers data to and from a preamplifier 26. The preamp 26 is coupled to a synchronously sampled data (SSD) channel 28 comprising a read channel and a write channel, and a control circuit 30. SSD channel 28 and control circuit 30 are used to process data being read from and written to platters 12, and to control the various operations of disk drive mass storage system 10. Host 32 exchanges digital data with control circuit 30.

Data is stored and retrieved from each side of the magnetic platters 12 by heads 18, 20 which comprise a read head 18 and a write head 20 at the tip thereof. The conventional readhead 18 and writehead 20 comprise magneto-resistive heads adapted to read or write data from/to platters 12 when current is passed through them. Heads 18, 20 are coupled to preamplifier 26 that serves as an interface between read/write heads 18/20 of disk/head assembly 10 and SSD channel 28. The preamp 26 provides amplification to the waveform data signals as needed. A preamp 26 may comprise a single chip containing a reader amplifier 22, a writer amplifier, fault detection circuitry, and a serial port, for example. Alternatively, the preamp 26 may comprise separate components rather than residing on a single chip.

It is desired to achieve high data rates of greater than 1 Gb/s in the write mode. Conventional solutions use a voltage mode to deliver the write data to an H-current switch in the pre-amplifier 26. This voltage mode, however, is not adequate for high data rates greater than 1 Gb/s since the on-chip interconnection and the loading of inactive channels slows the write data. Conversely, if the current mode is utilized, the current mode typically requires two signal lines to achieve a differential current mode for each channel. Typically, the pre-amplifier 26 can have 1, 2, 4, 8, 10 or 12 channels. Thus, in a servo multi-channel write operation, for a 12-channel pre-amplifier, 24 signal buses would need to be laid out all over the integrated circuit, which disadvantagly increases the die size and increases the layout routing complexity.

Hence, the conventional limitations in write data circuits are that the voltage mode is not fast enough, and in the current mode conventional circuits become complex. In addition, parasitic loading effects of on-chip interconnection on data speeds limits the write data rate. In addition, the capacitance loading effect of inactive channels on the write data signals also limits the use of writing using the current mode.

SUMMARY OF THE INVENTION

The present invention achieves technical advantages as a write data circuit selectively utilizing current mode ECL level data when writing to a signal channel, and selectively utilizing a voltage mode ECL level when writing to multiple channels. Advantageously, in a single channel write event, the current mode delivers very fast and sharp write currents to the preamplifier H-switch without performance degradation due to on-chip interconnection. When writing to multiple channels, such as in the servo mode, the servo multi-channel write operation does not need to be very fast, and thus the voltage mode write data is adequate. In addition, both the voltage mode and current mode write data share the same differential interconnection to the heads, which advantageously reduces the die area and provides minimum production cost and reduces complexity. For instance, two lines are utilized for four channels, instead of eight lines.

DETAILED DESCRIPTION OF THE PREFERRED EMBODIMENT

Figure 2A:
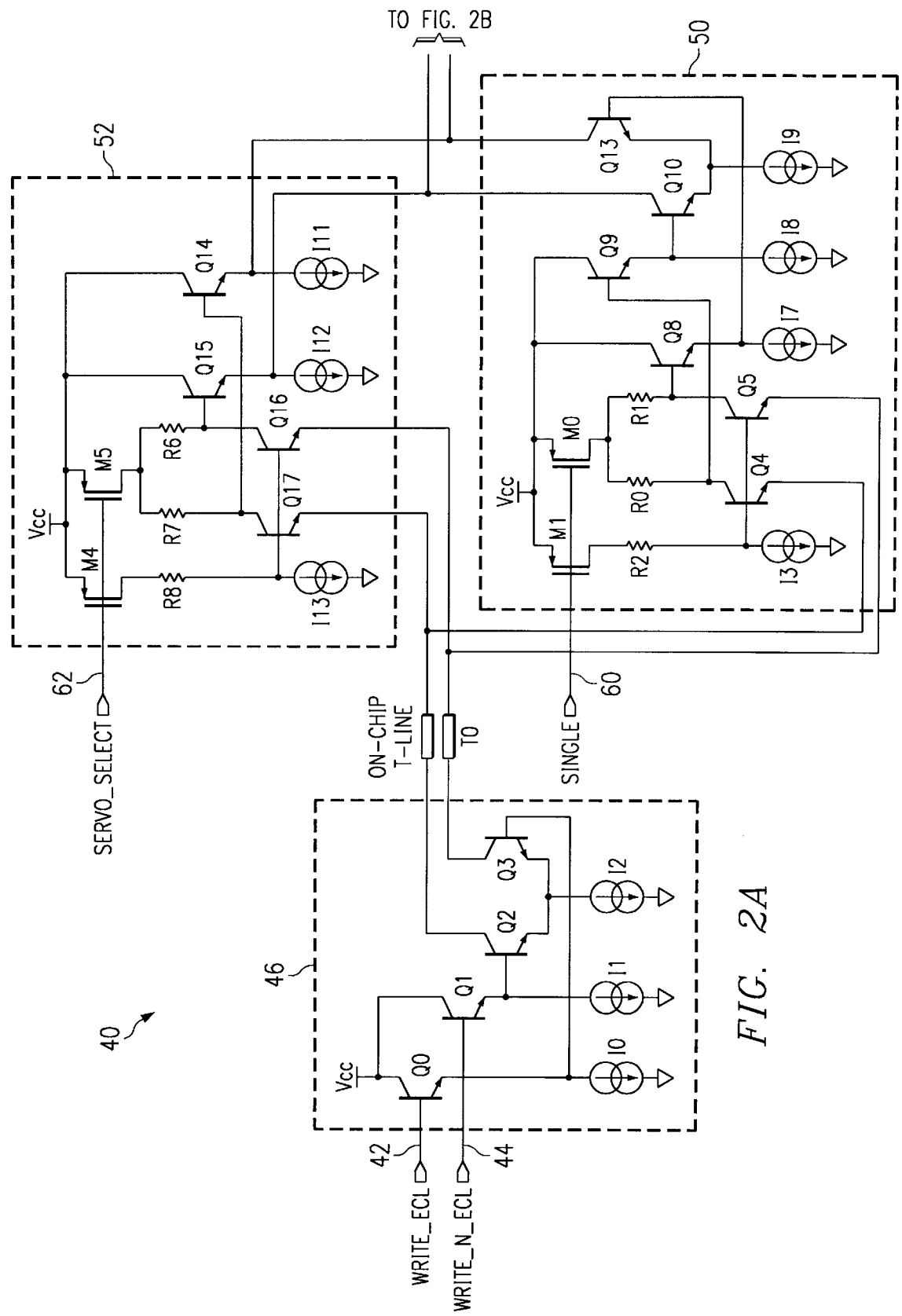
FIGS. 2A and 2B are a schematic diagram of a write data circuit adapted to write data to a single channel in the current mode ECL, and to multi-channels with a voltage mode ECL.
Figure 2B:
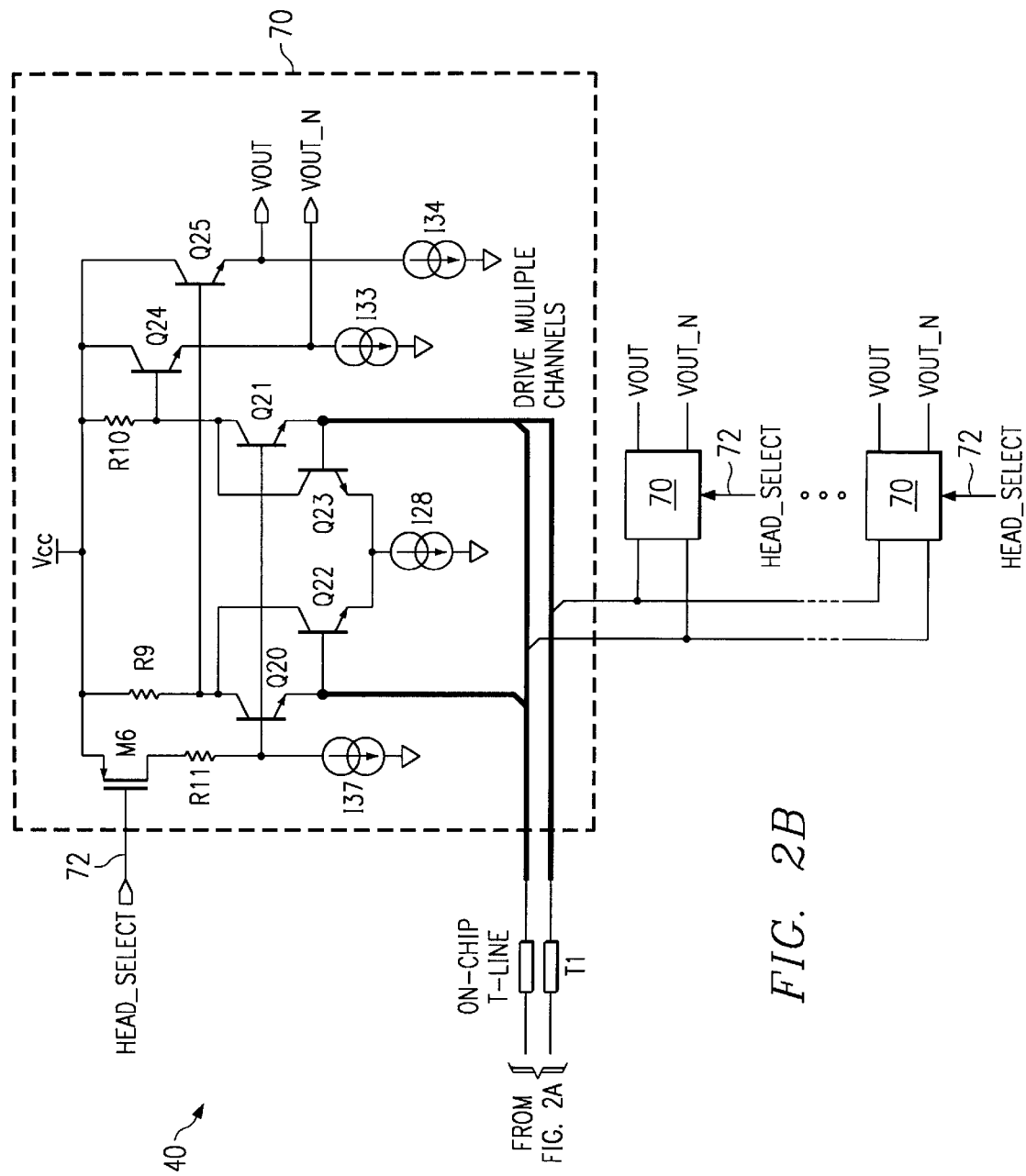

Referring now to FIGS. 2A and 2B, there is illustrated a schematic diagram of a write data drive circuit 40 according to the preferred embodiment of the present invention. Write data drive circuit 40 is seen to include a pair of signal inputs 42 and 44 defining a differential input, identified as write_ECL and write_N_ECL each coupled to and driving a write data buffer shown at 46. The write data buffer 46 receives differential ECL-level write signals from the channel. Buffer 46 consists of bi-polar transistors Q0–Q3, and current sources 10–12. The outputs of the buffer cell 46 are currents from the collectors of transistors Q2 and Q3. These currents drive the on-chip differential interconnection, identified as T0, about 3 mm in length.

The differential interconnection T0 is seen to couple to and drive a central buffer seen to comprise of two main circuits, a first circuit 50 adapted for single channel write operation, and second circuit 52 for servo write operation to multiple channels.

The single write cell 50 is seen to include main cascoded transistors Q4 and Q5, and gain resistors R0 and R1. MOSFET devices M1 and M2 are used to select/deselect the single write function as controlled by a signal provided to control line 60. Resistor R2 and current source I3 provide DC biasing voltage for the cascoded transistors Q4 and Q5. Transistors Q8, Q9 and current sources I7, I8 are emitter-followers to buffer and level shift down the signal. Transistor Q10 and Q13, and current source I9 are used to provide the current mode output to on-chip interconnection transmission line T1, as shown.

The multi-channels write circuit 52 is similar to the single-channel write cell 50. However, the emitters of the emitter-follower buffers, shown as transistors Q15 and Q14, are connected to the collector outputs of transistors Q10 and Q13 of the single channel write circuitry, and thus to the common connection of the output of the on-chip interconnection transmission line T1. Therefore, the outputs of the multi-channel write circuit 52 are provided in a differential voltage mode ECL level, instead of the current mode ECL of the single channel write circuit 50. Thus, when selected by a control signal provided to the servo-select control line 62, the output is provided to transmission line T1, and thus to the heads, is in the differential voltage mode.

A pre-driver circuit 70 is seen to be located in each head (channel) cell. Each pre-driver circuit 70 receives the drive signal via on-chip interconnection transmission line T1, whether it be in the current mode as provided by circuit 50 or in the voltage mode as provided by circuit 52, and selectively delivers it to each head to be written to. The circuit 70 delivers the voltage mode ECL level to the current H-switch (not shown) of the pre-driver 26 locally to switch the write current in each head cell. When the respective head select pin 72 is enabled, the respective head is on. When all channels are written to, then all head-select pins 72 are on.

In summary, a differential current mode ECL level write data is provided to a write buffer 46, and is communicated in a current mode to drive a 3 mm on-chip interconnection T0 coupled to a central buffer. This current mode signal is either converted to a voltage mode for servo multi-channel write operation by circuit 52, or remains a current mode single channel write signal through circuit 50. The ECL output signals provided by both circuits 50 and 52 are provided to the common 2 mm on-chip interconnection T1. Driver circuit 40 provides higher performance, achieving rise/fall time <200 ps in normal write mode, single channel, and has adequate performance (200 ps–400 ps rise time) in servo write mode, multiple channels, without the trade-off of increasing the die size, which would otherwise increase production cost and power dissipation.

Figure 1:
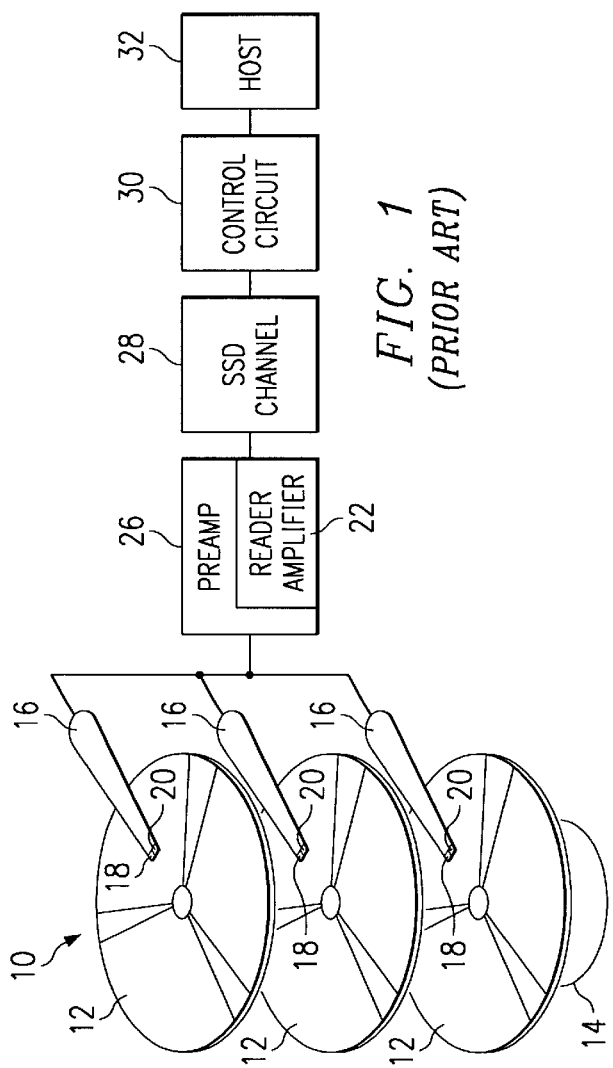
FIG. 1 illustrates a conventional disk drive system including multiple rotating disks or platters, read/write heads, a piezo actuator, a servo circuit, and associated amplifiers and control circuitry.
Figure 3:
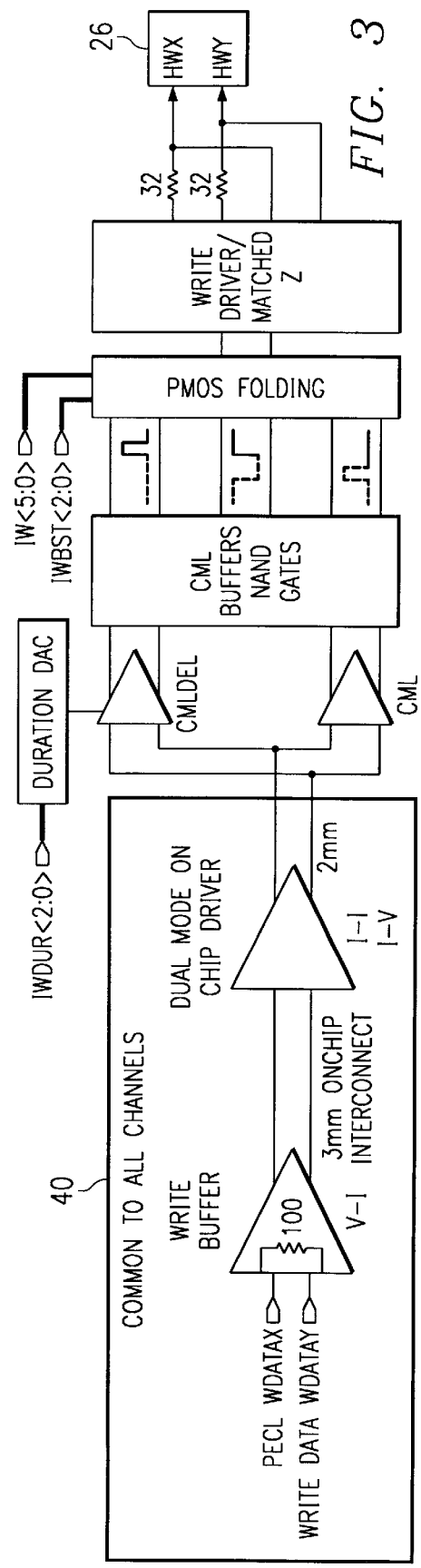
FIG. 3 depicts a block level of the write data path utilizing the write data circuit of the present invention, wherein the write data circuit is seen to be common to all channels.

Referring now to FIG. 3, there is illustrated a block level of the write data path implementing the driver circuit 40 of the present invention, whereby circuit 40 is common to all channels being driven.

Figure 4:
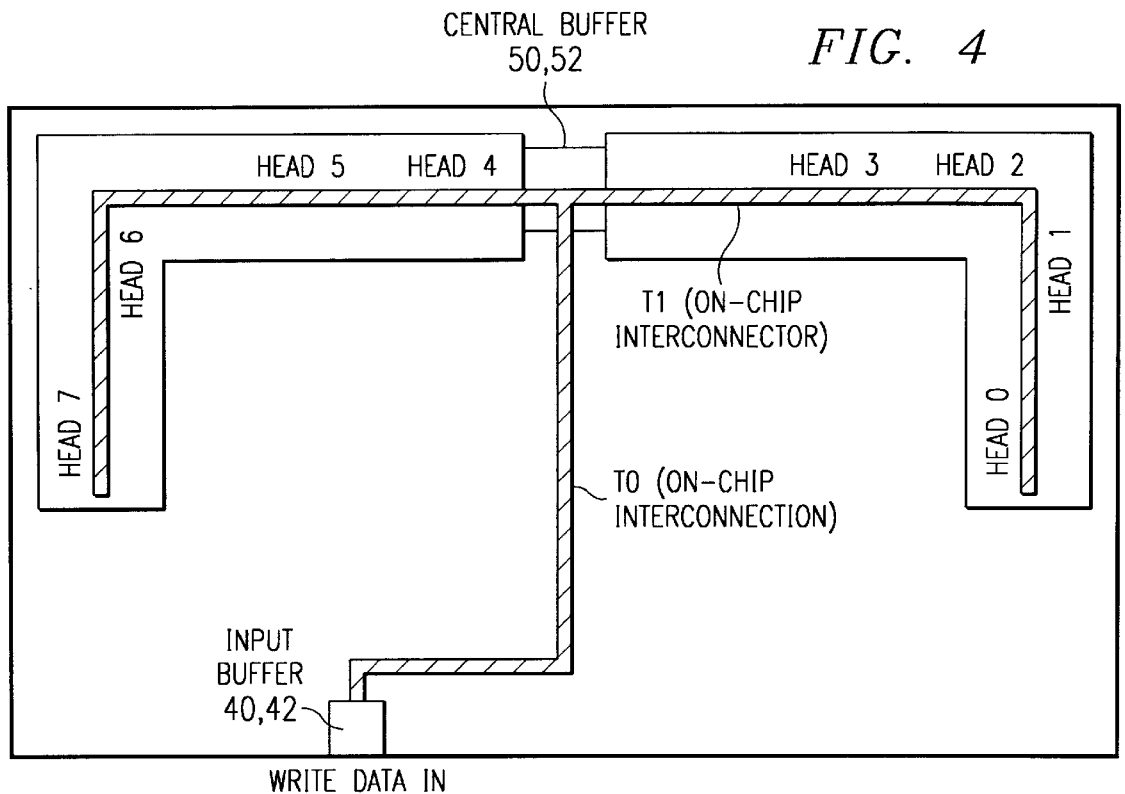
FIG. 4 depicts an 8-channel preamp IC layout according to the present invention.

FIG. 4 depicts a block diagram of a 8-channel preamp IC circuit layout, depicting the IC die configured to receive write data, communicate this data to an on-chip interconnection T0 to the central buffer 50, 52 and ultimately routed via communication line T1 to the respective selective heads.

Figure 5:
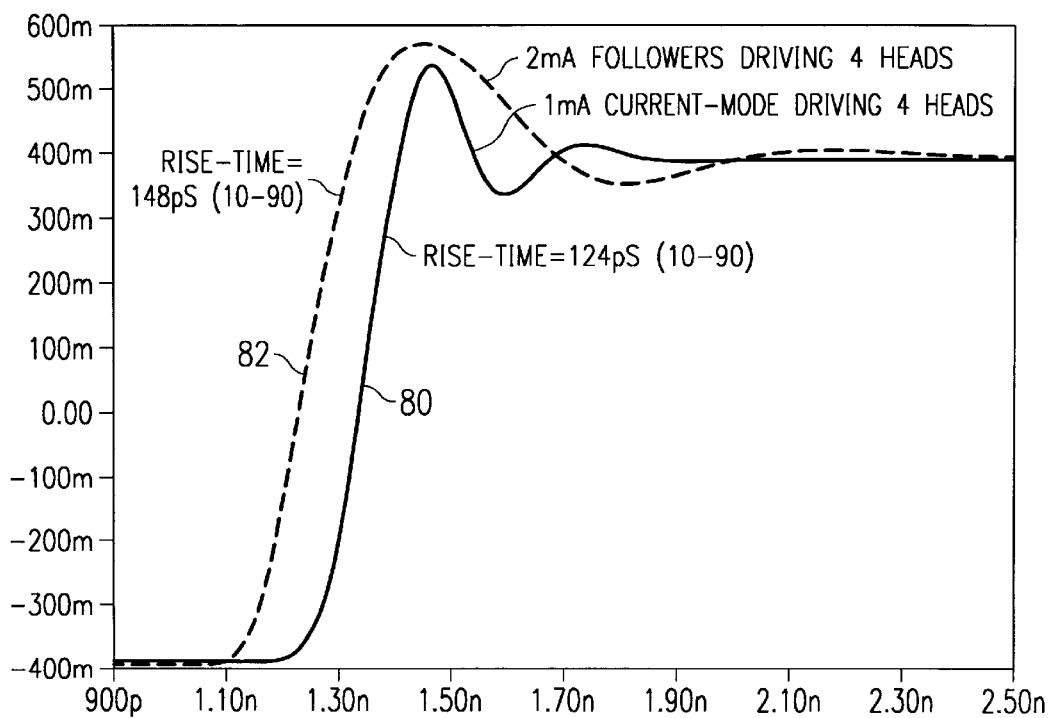
FIG. 5 is a waveform diagram comparing the voltage mode versus the current mode of bussing the write data signals using the circuit of the present invention.

FIG. 5 depicts a comparison of the rise times of driving a head in a voltage mode versus a current mode according to the present invention, whereby signal line 80 depicts a 1 mA current-mode data write driving 4 heads, and signal line 82 depicts a 2 mA voltage-mode drive of 4 heads. In both examples, it is seen that the rise times is approximately 124 pS for waveform 80, and 148 pS for waveform 82. And yet only 1 mA current drive is used for signal line 80, instead of 2 mA for waveform 82. Thus, significant power reduction is achieved.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A write drive circuit, comprising:

an input circuit adapted to receive an input signal;

a first circuit adapted to receive said input signal from said input circuit and provide a voltage mode output signal;

a second circuit adapted to receive said input signal from said input circuit and provide a current mode output signal; and an output circuit adapted to couple either said voltage mode output signal or said current mode output signal to a drive output as a drive signal.

2. The circuit as specified in claim 1 wherein said input signal is a current mode signal.

3. The circuit as specified in claim 2 wherein said second circuit maintains said input signal as a current mode signal.

4. The circuit as specified in claim 3 wherein said first circuit converts said current mode input signal to a voltage mode signal.

5. The circuit as specified in claim 1 wherein said current mode output signal and said voltage mode output signal are coupled to said output circuit via a common line.

6. The circuit as specified in claim 1 wherein said input signal is an ECL level signal.

7. The circuit as specified in claim 6 wherein the drive signal is an ECL level signal.

8. The circuit as specified in claim 4 wherein both the current mode output signal and the voltage mode output signal are ECL level signals.

9. The circuit as specified in claim 1 further comprising control circuitry coupled to said first circuit and said second circuit, said control circuit controlling which of said voltage mode output signal or said current mode output signal is provided to said output circuit.

10. The circuit as specified in claim 1 wherein said input circuit is coupled to said first circuit and said second current via a differential transmission line.

11. The circuit as specified in claim 10 wherein said first circuit and said second circuit are coupled to said output circuit via a differential transmission line.

12. The circuit as specified in claim 1 further comprising a plurality of heads coupled to said output circuit.

13. The circuit as specified in claim 12 further comprising control circuitry selectively controlling which of said plurality of heads is driven by said output circuit.

14. The circuit as specified in claim 13 wherein said second circuit provides said current mode output signal to said output circuit when one said head is driven, and said first output circuit provides said voltage mode output signal to said output circuit when multiple said heads are driven.

15. A method of driving heads in a mass media device, comprising the steps of:

driving said heads with either a voltage mode signal or a current mode signal as a function of the number of said heads being driven.

16. The method as specified in claim 15 wherein said current mode signal drives said head when one said head is driven, and said voltage mode signal drives said head when multiple said heads are driven.

17. The method as specified in claim 16 wherein a first circuit provides said current mode signal to output circuit, and a second circuit provides said voltage mode signal to said output circuit, wherein both said first circuit and said second circuit provide said respective signals to said output circuit over a common transmission line.

18. The method as specified in claim 17 wherein said transmission line comprises a differential transmission line including two conductors.

19. The method as specified in claim 15 further comprising the step of receiving a current mode input signal, and either maintaining said current mode signal or converting said current mode signal to a voltage mode signal as a function of the number of heads being driven.

20. The method as specified in claim 19 wherein said input current mode signal is provided via a common differential transmission line to two different circuits, one said circuit maintaining said current mode signal and the other circuit converting said current mode signal to said voltage mode signal.

* * * * *